United States Patent [19]

Provasnik

[11] 4,282,754
[45] Aug. 11, 1981

[54] TEMPERATURE SENSOR FOR MEASURING THE TEMPERATURE OF AN ENGINE

[75] Inventor: Robert Provasnik, Holland, Pa.

[73] Assignee: Siemens Corporation, Iselin, N.J.

[21] Appl. No.: 94,438

[22] Filed: Nov. 15, 1979

[51] Int. Cl.³ .......................... G01K 1/14; G01K 7/16
[52] U.S. Cl. .................................... 73/346; 338/22 R
[58] Field of Search ............................ 73/346, 343 R; 338/22 R

[56] References Cited

U.S. PATENT DOCUMENTS

| | | | |
|---|---|---|---|
| 1,692,301 | 11/1928 | Heslewood | 73/346 |
| 2,279,846 | 4/1942 | Stapleton | 73/343 R |
| 2,417,860 | 3/1947 | Cline | 73/343 R |
| 2,573,205 | 10/1951 | Lamb | 73/343 R |
| 3,170,327 | 2/1965 | Powell | 73/346 X |
| 3,302,107 | 1/1967 | Flaugher et al. | 73/343 R |
| 3,552,210 | 1/1971 | Wright, Jr. | 73/362 AR |
| 4,079,350 | 3/1978 | Sentementes | 338/22 R |
| 4,166,451 | 9/1979 | Salera | 73/362 AR |
| 4,186,604 | 2/1980 | Mattila | 73/346 X |

Primary Examiner—Daniel M. Yasich
Attorney, Agent, or Firm—Spellman, Joel & Pelton

[57] ABSTRACT

A temperature sensor for an engine such as an automotive engine, which sensor comprises in combination an electric heat sensitive device such as preferably a thermistor, a contact board and a housing. One of the surfaces of the magnet magnetically attaches the sensor to the engine. The magnet has an aperture for housing the heat sensitive device which is retained within the aperture by a heat-conductive material. The contact board connects the leads of the heat sensitive device with leads of a cable which may be connected to an indicating device. The housing of the sensor, made of an electrically insulating material, partially encloses the magnet, thereby leaving open a surface for magnetic attachment to a ferromagnetic part of the engine, the temperature of which is to be determined.

6 Claims, 4 Drawing Figures

TEMPERATURE SENSOR FOR MEASURING THE TEMPERATURE OF AN ENGINE

BACKGROUND OF THE INVENTION

1. Field of the Invention

This invention relates to a novel and improved temperature sensor for measuring the temperatures of an engine, particularly of an internal combustion engine. More particularly, this invention relates to a temperature sensor which is not installed permanently but which can readily be attached to and removed from the engine. Still more particularly, this invention relates to a temperature sensor which can be used as a temperature probe of an automotive engine analyzer.

2. Description of the Prior Art

In the field of automotive engine analysis, it is necessary to measure various temperatures, such as the engine block temperature, the engine oil temperature and other temperatures of engine parts and operations or subsystems. For this purpose there are needed temperature sensors or probes which can easily be attached to and removed from the engine. There are various ways to attach a temperature probe to the engine block. Devices which are used in automotive analysis include clips, in the first line so-called alligator clips, washer type bolt-on units, cartridges, etc. From U.S. Pat. No. 3,302,107, FIGS. 16–18a, it is also known to insert a temperature sensor through the oil dipstick tube into the engine oil. This sensor provides a direct reading of the oil temperature of the engine. However, the procedure of inserting the temperature probe into the small oil dipstick tube is time consuming, causes oil residue and requires cleaning of the probe after each measurement.

SUMMARY OF THE INVENTION

1. Objects

An object of this invention is to provide a temperature sensor for easily measuring the temperature of an engine.

Another object of this invention is to provide a temperature sensor for measuring the temperature of an engine, which sensor can easily and quickly be attached to and removed from the engine.

Another object of this invention is to provide a temperature sensor which is comparatively small and compact and allows for fast temperature readings.

Another object of this invention is to provide a temperature sensor which can be used for repeated measurements under rough environmental conditions.

Another object of this invention is to provide a temperature sensor which is very well suited for automotive garages and repair shops, particularly in connection with an automotive engine analyzer.

Another object of this invention is to provide a temperature sensor which allows for measuring the temperature of the engine oil of an automobile engine without inserting a temperature sensitive device through the oil dip-stick tube into the engine oil.

2. Summary

According to this invention, a temperature sensor for measuring the temperature of an engine comprises a magnet, a heat sensitive device, electrical contact means and a housing. The magnet has an aperture therein. The magnet further has a contact surface for magnetically attaching it to the engine. The heat sensitive device, such as a thermistor, has electrical leads. The device is retained within the aperture of the magnet by a heat-conductive material such as Wakefield Delta Bond 152. The electrical leads of the heat sensitive device extend out of the aperture. They are electrically connected to electrical connection points, which are comprised by the electrical contact means. The housing is made of an electrically insulating material. The housing partially encloses the magnet and the contact board, leaving open the magnetic contact surface of the magnet.

According to a preferred embodiment of the invention, the contact means comprises an electrically insulating board and two electrically conductive strips thereon. The electrical connection points are formed on the conductive strips. In this embodiment, the usually very thin leads of the heat sensitive device can be electrically connected to first points on said strips, and the comparatively thick leads of an electric lead capable can be electrically connected to remote second points on said strips. Thus an electric connection can easily be performed.

According to another preferred embodiment, the magnet is of cylindrical shape. The clearance opening of the magnet is formed along the longitudinal axis thereof and extends entirely throughout the magnet.

BRIEF DESCRIPTION OF THE DRAWINGS

The foregoing and other objects, features and advantages of the invention will be apparent from the following more particular descriptions of preferred embodiments of the invention as illustrated in the accompanying drawings.

In the drawings.

DESCRIPTION OF THE PREFERRED EMBODIMENTS

Figure 1:
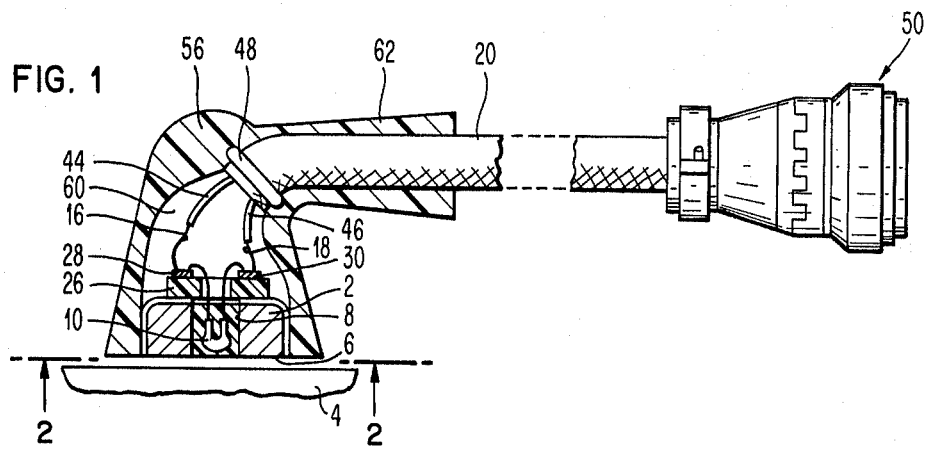
FIG. 1 is a general view of a temperature sensor, partially in cross-section, for measuring the temperature of an automobile engine.
Figure 2:
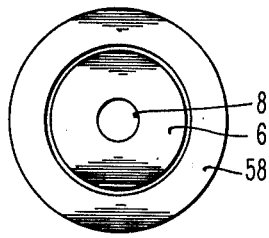
FIG. 2 is a plan view of the magnetic contact side of the temperature sensor according to FIG. 1.

With reference to FIGS. 1 and 2, a temperature sensor is shown which can be used as part of an engine analyzer to measure the temperature at various locations of an automobile engine. Particularly, the sensor shown in the drawings has been found useful to measure the temperature of the engine oil. The sensor incorporates the advantage that there is no necessity that it be inserted into the oil itself when a reading is taken.

The temperature sensor is mounted within a magnet 2 for magnetic attachment to any part 4 of an engine where a temperature reading is desirable. Part 4 may represent the automobile engine block, particularly that part of the engine block which contains the engine oil. By measuring the temperature of part 4, the temperature of the oil can be detected.

For the purpose of magnetic attachment to part 4, the magnet 2 has a surface 6 which has the same shape as the surface of part 4. As shown in the embodiment of FIG. 1, magnet 2 and part 4 have flat and even surfaces. These surfaces could also be curved.

The magnet 2 in FIGS. 1 and 2 is of the pot-type; in other words, it is of cylindrical shape. The surface 6 is formed by one of the two ends of the cylinder. The two ends of the magnet 2 represent a magnetic pole, respectively. The lower end is the surface 6.

An important feature of the magnet 2 is that it has an aperture 8 therein. This aperture 8 is formed along the longitudinal axis of the cylinder. Aperture 8 is a bore which extends throughout the magnet 2. In other words: the magnet 2 has a cylindrical hole through its center. The aperture 8 contains an electric heat sensitive device 10, particularly a temperature sensitive resistor (thermistor) of small size. The electric resistance of a thermistor varies according to the temperature to which it is exposed. Instead of a thermistor, a temperature sensitive device 10 can be used which delivers a voltage in accordance to the temperature applied.

In the aperture 8, which serves for protection purposes, the heat sensitive device 10 is arranged at the lower end of the magnet 2 close to the outer surface 6 to obtain true temperature readings. The heat sensitive device 10 has at least two electrical leads 12 and 14 which extend out of the upper end of the aperture 8.

The heat sensitive device 10 is retained within the aperture 8 by a heat conductive material, which is shown in FIG. 1 by scoring or hatching. The magnet 2 and the heat conductive material form a flat surface adjacent to the part 4. Thus, the magnet 2 will hold the heat sensitive device 10 to most any part 4 of the engine and its various sub-systems (which are generally made of iron or its alloys) where it is desirable to measure temperatures. Generally speaking, the magnet-temperature sensitive device combination 2-10 can be used to determine the temperature of any part 4 which is of ferromagnetic structure. Due to the heat conductive material, there is essentially no temperature difference between part 4 and the heat sensitive device 10.

Preferably the aperture 8 is used to cement a thermistor with any of the well known heat conductive epoxys, such as Wakefield, Delta Bond 152. The thermistor is the actual temperature sensing element. Its resistance and thereby the temperature can be determined by known means, for example, in a Wheatstone bridge. Arranged close to the magnet 2 is an electrical contact device 21 which serves to form an electrical contact between the heat sensitive device leads 12 and 14 and the lead-out leads 16 and 18, respectively, of an electric lead-out cable 20. This contact device 21 comprises two first electrical connection points 22 and 24 (see FIG. 4) to which the leads 12 and 14, respectively, of heat sensitive device 10 are connected.

Figure 4:
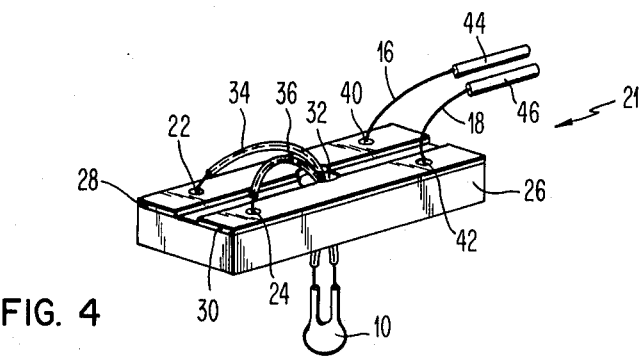
FIG. 4 is an enlarged isometric view of a contact board shown in FIG. 1.

For ease of lead attachment and handling of the heat sensitive device 10, an electrically insulating board 26 with two electrically conductive strips 28, 30 on the surface thereof can be used, as shown in FIGS. 1 and 4. The first connection points 22 and 24 are formed on the surface of the strips 28 and 30, respectively. Strips 28 and 30 are shown to be broader in FIG. 4 than in FIG. 1. They are arranged in spaced, parallel relationship electrically insulated from each other. The board 26 is shown to be preferably of rectangular shape. This board 26 can be a well known single-sided printed circuit with two solder tracks which are used as conductive strips 28 and 30.

As shown in FIGS. 1 and 4, the contact board 26 has a clearance opening 32 for leading the electrical leads 12 and 14 therethrough from the heat sensitive device 10 to the connection points 22 and 24, respectively. The clearance opening 32, drilled through the center of the board 26, is arranged between the two strips 28 and 30. To avoid short circuits, the leads 12 and 14 of the heat sensitive device 10 are provided with sleevings 34 and 36, respectively, as may be seen in FIG. 4.

As can be seen in FIG. 4, the lead-out cable leads 16 and 18 are connected to two second connection points 40 and 42, which are arranged on the strips 28 and 30 remotely from the first connection points 22 and 24. The leads 16 and 18 are also provided with sleevings 44 and 46, as shown in FIGS. 1 and 4.

Figure 3:
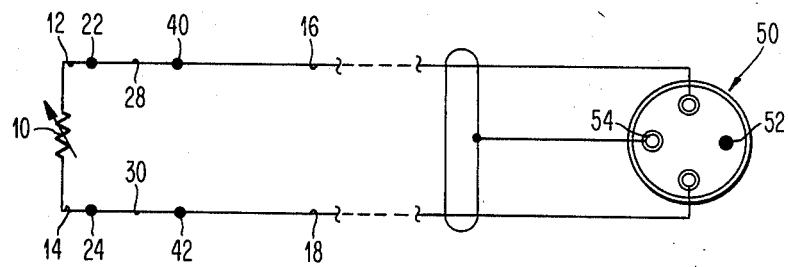
FIG. 3 is a representation of the electrical circuit which is used in the sensor of FIG. 1.

As illustrated in FIG. 1, a cord retainer 48 is secured to one end of the lead-out cable 20. To the other end there is connected a connector 50 of conventional type. As shown in FIG. 3, the connector 50 has two measuring pins, a key pin 52 and a shield pin 54. The shield pin 54 is connected to an electric shield, which shields cable 20.

Referring to FIG. 1, a housing or boot 56 encloses the contact board 26 together with its connection points 22, 24, 40, 42, and partially encloses also the magnet 2, thereby leaving open the flat surface 6 of the magnet 2. As can be seen in FIG. 1, the housing 56 has approximately the same size as the connector 50. The housing 56 is made of an electrically insulating material, particularly of an elastic material. Preferably it is made of silicon rubber. The housing 56 is formed as to hold the magnet 2 by its front or measuring portion, circumferentially encompassing thereby the magnet 2. The open end portion of the housing 56 has a rim 58 adjacent to part 4, which is arranged essentially in the same plane as the surface 6 of the magnet 2.

The interior 60 of the housing 56 is hollow. The connection points 22, 24, 40, 42 extend into this hollow interior, thereby protecting the electrical connection from thermal and mechanical influences.

The housing 56 further has an outlet portion 62. This outlet portion 62 serves for leading the lead-out cable 20 out of the housing 56 approximately parallel to the surface 6 of the magnet 2. This parallel arrangement simplifies the handling of the sensor by the operator. The provision of the board assembly 26, 28 and 20 permits the attachment of the very thin leads 12, 14 to connection points 22, 24, respectively. It further permits convenient connection of the leads 16, 18 (which are usually of much larger diameter) electrically to the heat sensitive device 10. The electrical connections may be soldered.

The temperature sensor may be assembled as follows: After soldering leads 12 and 14 to connection points 22 and 24, the heat sensitive device 10 is passed through the clearance hole 32, see FIG. 4. This device-board assembly is then attached to the upper side of magnet 2. The aperture 8 and the clearance hole 32 are aligned with each other. The device-board assembly is preferably cemented with a heat-conductive epoxy thereon, so that the sensor is close to the flat magnet face. The cord retainer 48 is then secured to the magnet end of the cable 20 to prevent the leads 16, 18 from being pulled through the insulating housing 56 which is now placed over the cable 20 and the magnet-device assembly 2, 10 and secured in place. The housing 56 desirably may be molded on the magnet assembly. This can be easily done if it is made of silicon rubber. The housing 56 acts as a thermal insulation, shielding the magnet 2 and the heat sensitive device 10 from airblast from a cooling fan of the automobile engine.

The temperature sensor shown in FIG. 1–4 is rugged and thus very well suited to a use in automotive garages and repair shops. The magnetic retention facilitates attachment and subsequent removal. Due to the small mass, the temperature sensor has very little heat-sinking effect thus providing for fast measurement times. The rubber housing 56 providing thermal insulation and impact protection during any rough treatment it may receive during use. Measurements have shown that the difference between the temperature measured by a prior art heat-sensitive device inserted through the dip-stick tube into the engine oil and the temperature measured by the present device when attached to the engine block containing motor oil, is insignificant.

While the form of the heat-sensing device herein described constitutes a preferred embodiment of the invention, it is to be understood that the invention is not limited to this precise form of assembly, and that a variety of changes may be made therein without departing from the scope of the invention.

What is claimed is:

1. A temperature sensor for measuring the temperature of an automobile engine, comprising:
   (a) a magnet of cylindrical shape having
      (a1) a longitudinal axis, an aperture being formed along said axis and extending through said magnet,
      (a2) a first flat end surface, and
      (a3) a second flat end surface for magnetic attachment to said engine;
   (b) an electric heat sensitive device for temperature measurements, said device having electrical leads and being retained within said aperture by a heat-conductive material, and said electrical leads extending out of said aperture at said first flat end surface;
   (c) an electrical insulating board attached to said first surface of said magnet, said board having
      (c1) a clearance opening for leading said electrical leads therethrough, and
      (c2) electrical connection points on elongated contact means mounted on the free surface of said insulating board, said leads from said heat sensitive device being electrically connected respectively to said points;
   (d) a lead-out cable having lead-out leads, said lead-out leads being spacedly electrically connected via said contact means respectively to said connection points; and
   (e) a thermal insulating housing of an elastic and electrical insulating material, said housing enclosing said board and said connecting points and circumferentially encompassing and holding said magnet, thereby leaving open said second surface of said magnet, and said housing comprises an outlet portion for leading said lead-out cable out of said housing approximately parallel to said second surface of said magnet.

2. The temperature sensor according to claim 1, wherein said board has a rectangular shape, and wherein said clearance opening is arranged centrally 3. The temperature sensor according to claim 1, wherein said housing is made of silicon rubber.

4. The temperature sensor according to claim 1, wherein said housing has an opening, said opening having a rim essentially in the same plane as said second surface of said magnet.

5. The temperature sensor according to claim 1, wherein said board is attached to said magnet by a heat conductive material.

6. The temperature sensor according to claim 1, wherein said heat-conductive material forms a plane which is arranged in the same plane as said second surface of said magnet.

* * * * *